(12) United States Patent
Xu et al.

(10) Patent No.: US 9,830,122 B2
(45) Date of Patent: Nov. 28, 2017

(54) DUAL SCREEN DISPLAY APPARATUS, DUAL SCREEN DISPLAY METHOD, AND ELECTRONIC DEVICE

(71) Applicant: Lenovo (Beijing) Co., Ltd., Haidian District, Beijing (CN)

(72) Inventors: Fang Xu, Beijing (CN); Ke Shang, Beijing (CN); Na Ju, Beijing (CN); Zhenhua Zhang, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 111 days.

(21) Appl. No.: 14/348,332

(22) PCT Filed: Apr. 8, 2013

(86) PCT No.: PCT/CN2013/073903
§ 371 (c)(1),
(2) Date: Mar. 28, 2014

(87) PCT Pub. No.: WO2013/152701
PCT Pub. Date: Oct. 17, 2013

(65) Prior Publication Data
US 2015/0301779 A1    Oct. 22, 2015

(30) Foreign Application Priority Data
Apr. 11, 2012 (CN) .......................... 2012 1 0105189

(51) Int. Cl.
*G09G 5/00* (2006.01)
*G06F 3/14* (2006.01)
(Continued)

(52) U.S. Cl.
CPC ........ *G06F 3/1431* (2013.01); *G02F 1/13362* (2013.01); *G02F 1/133606* (2013.01);
(Continued)

(58) Field of Classification Search
CPC ......... G06F 3/1431; G06F 3/147; G09G 3/36; G09G 3/3406; G09G 5/14; G09G 2360/04;
(Continued)

(56) References Cited

U.S. PATENT DOCUMENTS

| 5,896,575 A | 4/1999 | Higginbotham et al. |
| 7,034,451 B2 | 4/2006 | Senbonmatsu |

(Continued)

FOREIGN PATENT DOCUMENTS

| CN | 1356584 A | 7/2002 |
| CN | 1492719 | 4/2004 |

(Continued)

OTHER PUBLICATIONS

PCT/CN2013/073903 International Search Report dated Jul. 18, 2013 (6 pages including English translation).
(Continued)

*Primary Examiner* — Michael Pervan
*Assistant Examiner* — Andrew Lee
(74) *Attorney, Agent, or Firm* — Brinks Gilson & Lione; G. Peter Nichols

(57) ABSTRACT

A dual screen display device, dual screen display method, and electronic equipment are described. The device includes a first display unit and a second display unit, a light receiving surface of the first display unit being arranged opposite to a light receiving surface of the second display unit; a backlight module unit, arranged between the light receiving surface of the first display unit and the light receiving surface of the second display unit; a light source unit, used for emitting illumination light to the backlight module unit; and a first polarization filtering unit and a second polarization filtering
(Continued)

unit, arranged on the light receiving surface of the first display unit and the light receiving surface of the second display unit respectively.

6 Claims, 4 Drawing Sheets

(51) Int. Cl.
G09G 3/34 (2006.01)
G06F 3/147 (2006.01)
G09G 3/36 (2006.01)
G09G 5/14 (2006.01)
G02F 1/1335 (2006.01)
G02F 1/1333 (2006.01)

(52) U.S. Cl.
CPC .............. *G06F 3/147* (2013.01); *G09G 3/34* (2013.01); *G09G 3/3406* (2013.01); *G09G 3/36* (2013.01); *G09G 5/14* (2013.01); *G02F 1/1336* (2013.01); *G02F 2001/133342* (2013.01); *G02F 2201/58* (2013.01); *G02F 2203/01* (2013.01); *G09G 2300/023* (2013.01); *G09G 2320/0626* (2013.01); *G09G 2360/04* (2013.01)

(58) Field of Classification Search
CPC ...... G09G 2360/0626; G02F 1/133606; G02F 1/13362
USPC .................................... 345/4, 30, 50, 87, 102
See application file for complete search history.

(56) References Cited

U.S. PATENT DOCUMENTS

| | | | |
|---|---|---|---|
| 2004/0070809 A1 | 4/2004 | Senbonmatsu | |
| 2004/0239611 A1* | 12/2004 | Huang | G02B 6/0056 345/102 |
| 2006/0050199 A1 | 3/2006 | Hsu et al. | |
| 2006/0291252 A1* | 12/2006 | Lim | G02B 6/0036 362/618 |
| 2008/0174718 A1* | 7/2008 | Ma | G09G 3/342 349/62 |
| 2008/0231773 A1* | 9/2008 | Daiku | G02B 6/0056 349/65 |
| 2011/0175513 A1* | 7/2011 | Jeong | H01L 51/5281 313/113 |
| 2011/0292096 A1* | 12/2011 | Ohhara | G09G 3/3406 345/690 |

FOREIGN PATENT DOCUMENTS

| | | |
|---|---|---|
| CN | 1627149 | 6/2005 |
| JP | 2004199028 | 7/2004 |

OTHER PUBLICATIONS

PCT/CN2013/073903 International Preliminary Report on Patentability dated Oct. 14, 2014 (12 pages including English translation).
Chinese First Office Action with English Translation for related Application No. 201210105189.1 dated Apr. 21, 2015, 15 pages.

* cited by examiner

DUAL SCREEN DISPLAY APPARATUS, DUAL SCREEN DISPLAY METHOD, AND ELECTRONIC DEVICE

This application claims priority to International Application No. PCT/CN2013/073903; filed Apr. 8, 2013, and to Chinese Patent Appln. 201210105189.1 filed Apr. 11, 2012; the entire contents of each are incorporated herein by reference.

BACKGROUND

The invention relates to the field of LCD display; and more particularly relates to a dual screen display apparatus, dual screen display method, and electronic device.

In order to increase functions and provide users more convenient operation, more and more electronic products in recent years are usually equipped with the second display screen besides the main display screen. For example, flip mobile phone is usually composed of two screens: internal one used for performing the display of video play, games applications, and text editing applications, and external one often used to display information related to communication processing such as calling number display, SMS themes, and the like. Nowadays, with the rapid development of the mobile internet technology, there has been a gradual tendency for mobile internet devices such as tablet PC and so on to adopt a dual screen display design in order to make users have a better using experience.

The present dual screen display module is generally designed to paste the backs of two display units together. In this way, it is not difficult to achieve the dual screen display apparatus but the thickness and weight of this dual screen display module is twice as much as the single screen display module. However, such thickness and weight is far from meeting the users' requirements for super slim and super thin of the portable mobile terminal especially in today's progress of the mobile internet technology. Therefore, it is hoped that there is provided a dual screen display apparatus, method, and electronic devices using the dual screen display apparatus and dual screen display method which can achieve slimmer and thinner dual screen display apparatus and perform an appropriate dual screen display according to the display requirements.

SUMMARY

In view of the above circumstance, the present invention provides a dual screen display apparatus, dual screen display method, and electronic device.

In accordance with an embodiment of the present invention, there is provided a dual screen display apparatus which comprises: a first display unit and a second display unit, a light receiving surface of the first display unit being arranged opposite to a light receiving surface of the second display unit; a backlight module unit, arranged between the light receiving surface of the first display unit and the light receiving surface of the second display unit; a light source unit, used for emitting illumination light to the backlight module unit; and a first polarization filtering unit and a second polarization filtering unit, arranged on the light receiving surface of the first display unit and the light receiving surface of the second display unit respectively. The polarization direction of the first polarization filtering unit is orthogonal to the polarization direction of the second polarization filtering unit. The illumination light is deflected to the first display unit and the second display unit through the backlight module unit, and illuminates the first display unit and the second display unit after passing through the first polarization filtering unit and the second polarization filtering unit.

In addition, in the dual screen display apparatus according to an embodiment of the present invention, the light source unit comprises a first light source unit and a second light source unit which are arranged on either side of the backlight module unit respectively and are used for emitting a first illumination light and a second illumination light respectively.

Also, the dual screen display apparatus according to an embodiment of the present invention, further comprises a first polarizing unit and a second polarizing unit, the first polarizing unit and the second polarizing unit being arranged between the first light source unit and the backlight module unit and between the second light source unit and the backlight module unit, respectively and being used for receiving the first illumination light and the second illumination light to generate a first polarized illumination light and a second polarized illumination light, respectively; wherein the polarization direction of the first polarization filtering unit is same as that of the first polarizing unit and the polarization direction of the second polarization filtering unit is same as that of the second polarizing unit.

Also, the dual screen display apparatus according to an embodiment of the present invention, further comprises a light source control unit used for controlling the first light source unit and the second light source unit to emit light respectively or simultaneously according to the requirements.

Also, in the dual screen display apparatus according to an embodiment of the present invention, the first polarizing unit and the second polarizing unit is polarizing diaphragm or polarizing glass.

Also, in the dual screen display apparatus according to an embodiment of the present invention, the backlight module unit comprises a light guide plate and diffusion sheet.

Also, in the dual screen display apparatus according to an embodiment of the present invention, the backlight module unit further comprises a brightness enhancement film.

In accordance with another embodiment of the present invention, there is provided a dual screen display method applied into an electronic device which comprises a display control unit and a dual screen display apparatus, the dual screen display apparatus comprises a first display unit and a second display unit, a light receiving surface of the first display unit being arranged opposite to a light receiving surface of the second display unit; a backlight module unit, arranged between the light receiving surface of the first display unit and the light receiving surface of the second display unit; a light source unit, used for emitting illumination light to the backlight module unit; a light source control unit used for controlling the light source unit to emit light; and a first polarization filtering unit and a second polarization filtering unit, arranged on the light receiving surface of the first display unit and the light receiving surface of the second display unit respectively, and the polarization direction of the first polarization filtering unit is orthogonal to the polarization direction of the second polarization filtering unit, wherein the illumination light is deflected to the first display unit and the second display unit through the backlight module unit, and illuminates the first display unit and the second display unit after passing through the first polarization filtering unit and the second polarization filtering unit, the dual screen display method comprises: the display control unit transmitting display control signals to the dual screen display apparatus according to the display requirements of the electronic device; the light source control unit in the dual screen display apparatus generating light source control signals based on the received display control signals and transmitting the light source control signals to the light source unit; and the light source unit emitting light based on the received light source control signals.

In addition, in the dual screen display method according to another embodiment of the present invention, the light source unit comprises the first light source unit and the second light source unit which are arranged on either side of the backlight module unit respectively and used for emitting the first illumination light and the second illumination light respectively.

Also, in the dual screen display method according to another embodiment of the present invention, the dual screen display apparatus further comprises a first polarizing unit and a second polarizing unit which are arranged between the first light source unit and the backlight module unit and between the second light source unit and the backlight module unit respectively and are used for receiving the first illumination light and the second illumination light to generate the first polarized illumination light and the second polarized illumination light, respectively; wherein the polarization direction of the first polarization filtering unit is same as that of the first polarizing unit and the polarization direction of the second polarization filtering unit is same as that of the second polarizing unit.

Also, in the dual screen display method according to another embodiment of the present invention, the light source unit emitting light based on the received light source control signals comprises: the first light source unit and the second light source unit emitting light respectively or simultaneously based on the received light source control signals.

In accordance with still another embodiment of the present invention, there is provided an electronic device which comprises a dual screen display apparatus and a display control unit used for controlling the dual screen display apparatus, wherein the dual screen display apparatus comprises a first display unit and a second display unit, a light receiving surface of the first display unit being arranged opposite to a light receiving surface of the second display unit; a backlight module unit, arranged between the light receiving surface of the first display unit and the light receiving surface of the second display unit; a light source unit, used for emitting illumination light to the backlight module unit; and a first polarization filtering unit and a second polarization filtering unit, arranged on the light receiving surface of the first display unit and the light receiving surface of the second display unit respectively, and the polarization direction of the first polarization filtering unit is orthogonal to the polarization direction of the second polarization filtering unit, wherein the illumination light is deflected to the first display unit and the second display unit through the backlight module unit, and illuminates the first display unit and the second display unit after passing through the first polarization filtering unit and the second polarization filtering unit.

In addition, in the electronic device according to still another embodiment of the present invention, the light source unit comprises the first light source unit and the second light source unit arranged on either side of the backlight module unit respectively and used for emitting the first illumination light and the second illumination light respectively.

Also, the electronic device according to still another embodiment of the present invention, further comprises a first polarizing unit and a second polarizing unit, the first polarizing unit and second polarizing unit being arranged between the first light source unit and the backlight module unit and between the second light source unit and the backlight module unit, respectively and being used for receiving the first illumination light and the second illumination light to generate the first polarized illumination light and the second polarized illumination light, respectively, wherein the polarization direction of the first polarization filtering unit is same as that of the first polarizing unit and the polarization direction of the second polarization filtering unit is same as that of the second polarizing unit.

Also, the electronic device according to still another embodiment of the present invention, further comprises the light source control unit for controlling the first light source unit and the second light source unit to emit light respectively or simultaneously according to the requirements.

The dual screen display apparatus, dual screen display method and electronic device using the dual screen display apparatus according to embodiments of the present invention are able to achieve slimmer and thinner dual screen display apparatus and perform an appropriate dual screen display according to the display requirements.

It will be understood that both the foregoing general description and the following detailed description are exemplary and intended to provide further explanation of the claimed technology.

DETAILED DESCRIPTION

Hereinafter, one preferred embodiment of the present invention will be described with reference to the accompanying drawings.

At first, an electronic device applying the dual screen display apparatus according to an embodiment of the present invention will be described with reference to FIG. 1. The electronic device is preferably such as smart phones, personal digital assistants, tablet PCs, and so one.

Figure 1:
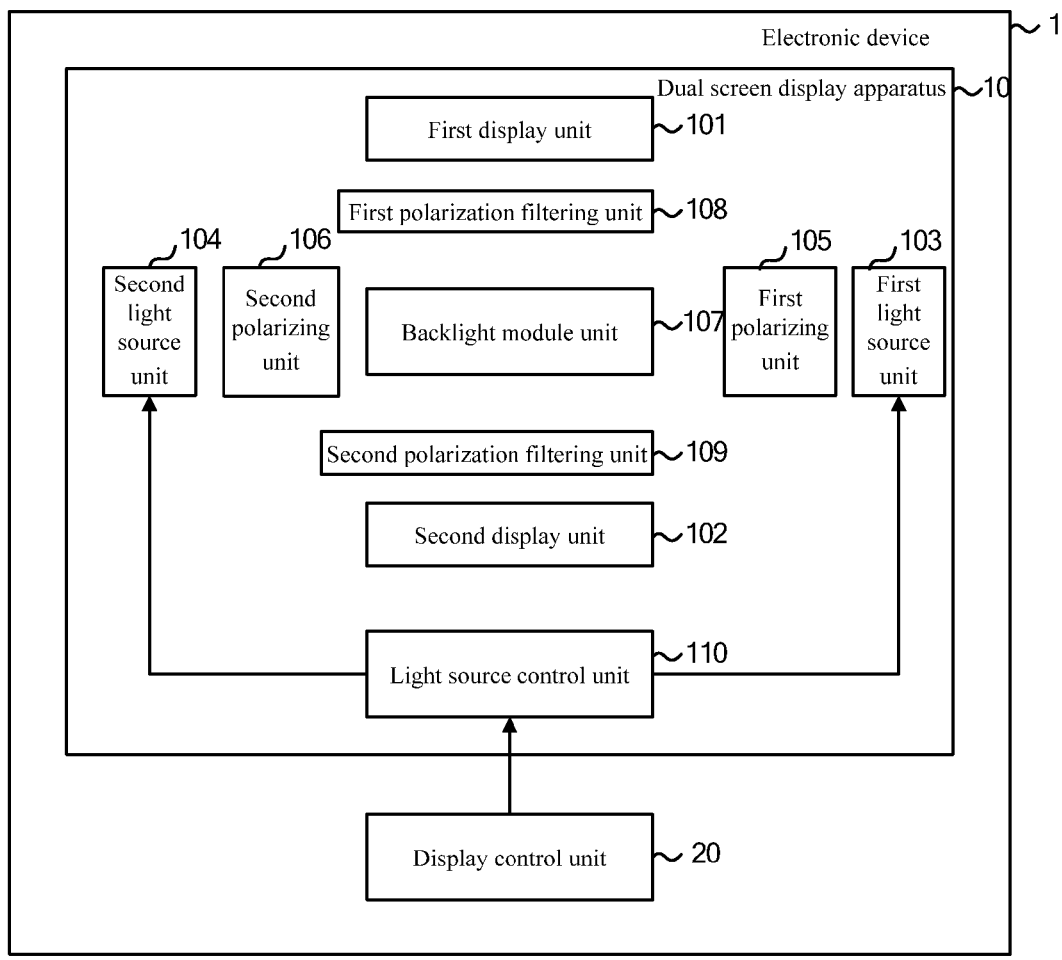
FIG. 1 illustrates a block diagram of an electronic device applying the dual screen display apparatus according to an embodiment of the present invention.

FIG. 1 illustrates a block diagram of an electronic device applying the dual screen display apparatus according to an embodiment of the present invention. As shown in FIG. 1, the electronic device 1 according to an embodiment of the present invention comprises a dual screen display apparatus 10 and a display control unit 20. It is noted that, in order to simplify the description, FIG. 1 shows only the components described above. Those skilled in the art will readily understand that the electronic device 1 according to an embodiment of the present invention may also comprise other components, such as a central processing unit, an input output unit, a communication unit and the like.

A specific configuration of the dual screen display apparatus 10 in the electronic device 1 will be described below in detail. As shown in FIG. 1, the dual screen display apparatus 10 comprises a first display unit 101 and a second display unit 102. In the preferred embodiment of the invention, the first display unit 101 and the second display unit 102 may be a LCD panel. A light receiving surface of the first display unit 101 is arranged opposite to a light receiving surface of the second display unit 102.

The dual screen display apparatus 10 comprises a backlight module unit 107. Different from two display units in the dual screen display apparatus having two respective backlight module units in the prior art, the first display unit 101 and the second display unit 102 in the dual screen display apparatus 10 according to an embodiment of the present invention will share the backlight module unit 107. In a preferred embodiment of the invention as shown in FIG. 1, the backlight module unit 107 is arranged between the light receiving surface of the first display unit 101 and the light receiving surface of the second display unit 102. In a preferred embodiment of the invention, the backlight module unit 107 comprises a light guide plate and diffusion sheet. In addition, the backlight module unit 107 further comprises a brightness enhancement film. Because the backlight module unit 107 is shared by the first display unit 101 and the second display unit 102, it will greatly decrease the thickness and weight of the dual screen display apparatus 10 as compared with the prior art.

Moreover, the dual screen display apparatus 10 comprises a light source unit which provides illumination light to the first display unit 101 and the second display unit 102. In a preferred embodiment of the invention as shown in FIG. 1, the light source unit comprises a first light source unit 103 and a second light source unit 104 which are arranged on either side of the backlight module unit 107 respectively and used for emitting a first illumination light and a second illumination light. Of course, it will be understood that: the present invention is not limited to this configuration, the dual screen display apparatus 10 may only have a single light source, and the illumination light emitted from a single light source are decomposed by the spectral components of the backlight module unit. Further, in a preferred embodiment of the present invention, the first light source unit 103 and the second light source unit 104 is LED lamps.

In addition, the dual screen display apparatus 10 further comprises a first polarization filtering unit 108 and a second polarization filtering unit 109 which are arranged on the light receiving surface of the first display unit 101 and the light receiving surface of the second display unit 102 respectively. The polarization direction of the first polarization filtering unit 108 is orthogonal to the polarization direction of the second polarization filtering unit 109. In other words, the illumination light is deflected to the first display unit 101 and the second display unit 102 through the backlight module unit 107, and illuminates the first display unit 101 and the second display unit 102 after passing through the first polarization filtering unit 108 and the second polarization filtering unit 109.

Also, the dual screen display apparatus 10 further comprises a first polarizing unit 105 and a second polarizing unit 106, the first polarizing unit 105 and a second polarizing unit 106 being arranged between the first light source unit 103 and the backlight module unit 107 and between the second light source unit 104 and the backlight module unit 107 respectively and being used for receiving the first illumination light and the second illumination light to generate the first polarized illumination light and the second polarized illumination light, respectively; wherein the polarization direction of the first polarization filtering unit 108 is same as that of the first polarizing unit 105 and the polarization direction of the second polarization filtering unit 109 is same as that of the second polarizing unit 106. In a preferred embodiment of the invention, the first polarizing unit 105 and the second polarizing unit 106 is polarizing diaphragm or polarizing glass.

Also, the dual screen display apparatus 10 further comprises a light source control unit 110 which is used for controlling the first light source unit 103 and the second light source unit 104 to emit lights respectively or simultaneously according to the requirements.

As shown in FIG. 1, the display control unit 20 in the electronic device 1 according to an embodiment of the present invention generates and transmits display control signals to the light source control unit 110 in the dual screen display apparatus 10 according to the display requirements of the electronic device 1.

Hereinbefore, the configuration of the electronic device 1 applying the dual screen display apparatus 10 according to an embodiment of the present invention has been described with reference to FIG. 1. Hereinafter, a dual screen display method applying the electronic device 1 of the dual screen display apparatus 10 according to an embodiment of the present invention will be further described with reference to FIG. 2.

Figure 2:
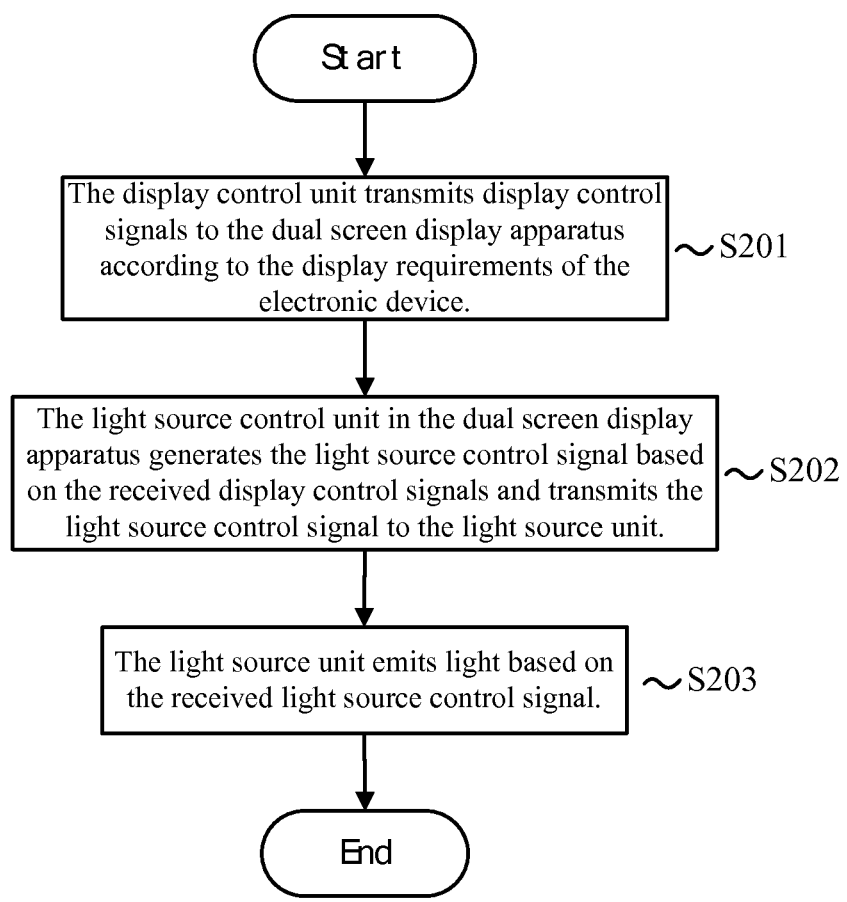
FIG. 2 illustrates a flow diagram of the dual screen display method according to an embodiment of the present invention.

FIG. 2 illustrates a flow diagram of the dual screen display method according to an embodiment of the present invention. As shown in FIG. 2, the dual screen display method according to an embodiment of the present invention comprises:

In step S201, the display control unit 20 transmits the display control signals to the dual screen display apparatus 10 according to the display requirements of the electronic device 1. In other words, the display control unit 20 performs a certain display according to requirements of the electronic device 1, for example, letting one of the first display unit 101 or the second display unit 102 perform a single-screen display, or letting the first display unit 101 and the second display unit 102 perform dual-screen display simultaneously, generates and transmits the corresponding display control signal to the light source control unit 110 of the dual screen display apparatus 10. Thereafter, the processing proceeds to step S202.

In step S202, the light source control unit 110 in the dual screen display apparatus 10 generates the light source control signal based on the received display control signals and transmits it to the light source unit. That is, if the display control signal indicates that the electronic device 1 expects the first display unit 101 to perform a display but the second display unit 102 not to do, the light source control unit 110 generates the corresponding light source control signal which indicates the first light source unit 103 corresponding to the first display unit 101 to emit light but the second light source unit 104 corresponding to the second display unit 102 not to do. In addition, if the display control signal indicates that the electronic device 1 expects the first display unit 101 and the second display unit 102 to perform the display simultaneously, the light source control unit 110 then generates a corresponding light source control signal which indicates the first light source unit 103 corresponding to the first display unit 101 and the second light source unit 104 corresponding to the second display unit 102 emit light simultaneously. Thereafter, the processing proceeds to step S203.

In step S203, the first light source unit 103 and the second light source unit 104 emits light based on the received light source control signal. Therefore, their corresponding first display unit 101 and second display unit 102 perform the display process.

Hereinafter, the process of realizing the display state desired by the electronic device 1 by controlling the first light source unit 103 and the second light source unit 104 to emit light according to the light source control signal is particularly described with reference to FIG. 3 and FIG. 4.

Figure 3:
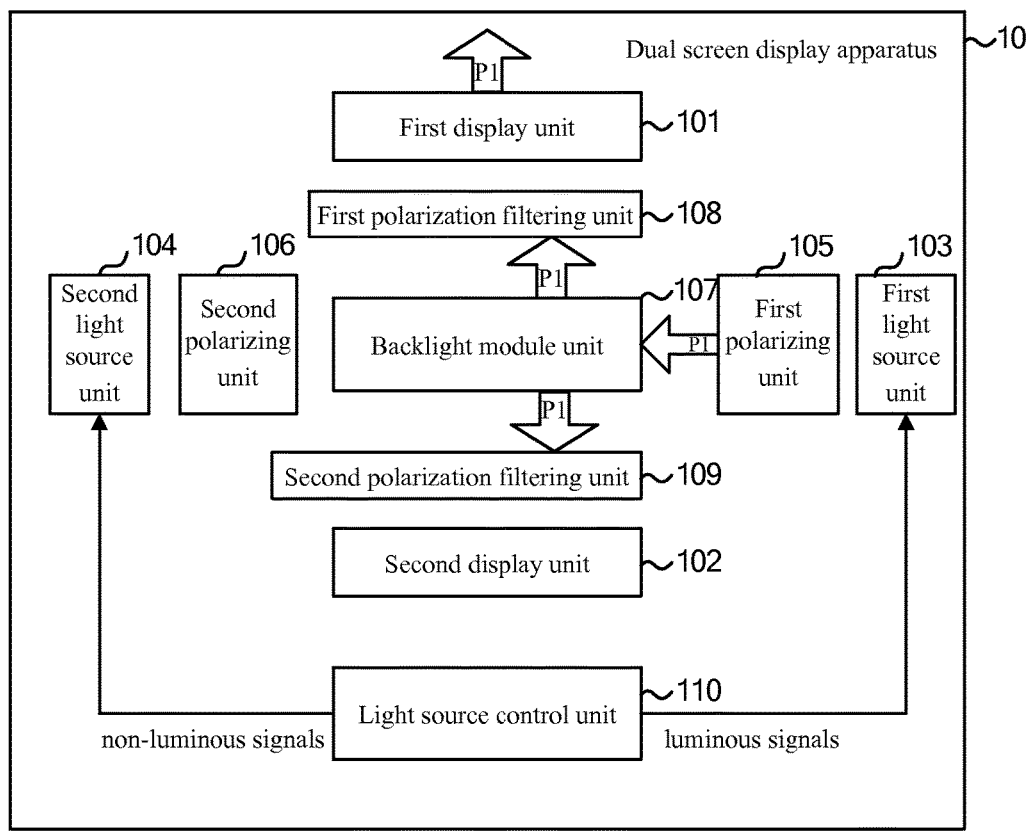
FIG. 3 illustrates a schematic of a display state of the dual screen display apparatus according to an embodiment of the present invention.

FIG. 3 illustrates a schematic of a display state of the dual screen display apparatus according to an embodiment of the present invention. Specifically, FIG. 3 shows a state of a display performed by only a single display unit in the dual screen display apparatus (in the embodiment shown in FIG. 3, the first display unit 101 performs the display alone).

As shown in FIG. 3, when the display control unit 20 in the electronic device 1 indicates that the first display unit 101 is expected to perform the display alone, the light source control unit 110 generates the corresponding light source control signal. In other words, the light source control unit 110 transmits a luminous signal to the first light source unit 103 and a non-luminous signal to the second light source unit 104.

In response to the received light source control signal, the first light source unit 103 emits light while the second light source unit 104 does not emit light. The illumination light emitted from the first light source unit 103 is firstly converted to the polarization light P1 polarized in the first direction through the first polarizing unit 105. The polarization light P1 shoots towards the first display unit 101 and the second display unit 102 simultaneously through the backlight module unit 107. Before reaching the first display unit 101, the polarization light P1 firstly reaches the first polarization filtering unit 108 arranged before the first display unit 101; since the polarization direction of the first polarization filtering unit 108 is same as that of the first polarizing unit 105, for example, both of them are in the first direction, the illumination light converted to the polarization light P1 may pass through the first polarization filtering unit 108 to reach the light receiving surface of the first display unit 101 such that the first display unit 101 performs a display. On the contrary, when the polarization light P1 reaches the second polarization filtering unit 109 arranged before the second display unit 102, the illumination light converted to the polarization light P1 cannot pass through the second polarization filtering unit 109 because the polarization direction of the second polarization filtering unit 109 is orthogonal to the polarization direction of the first polarizing unit 105, that is, the polarization direction of the second polarization filtering unit 109 is the second direction orthogonal to the first direction. At this time, since the illumination light is not received, the second display unit 102 would not perform the display.

Figure 4:
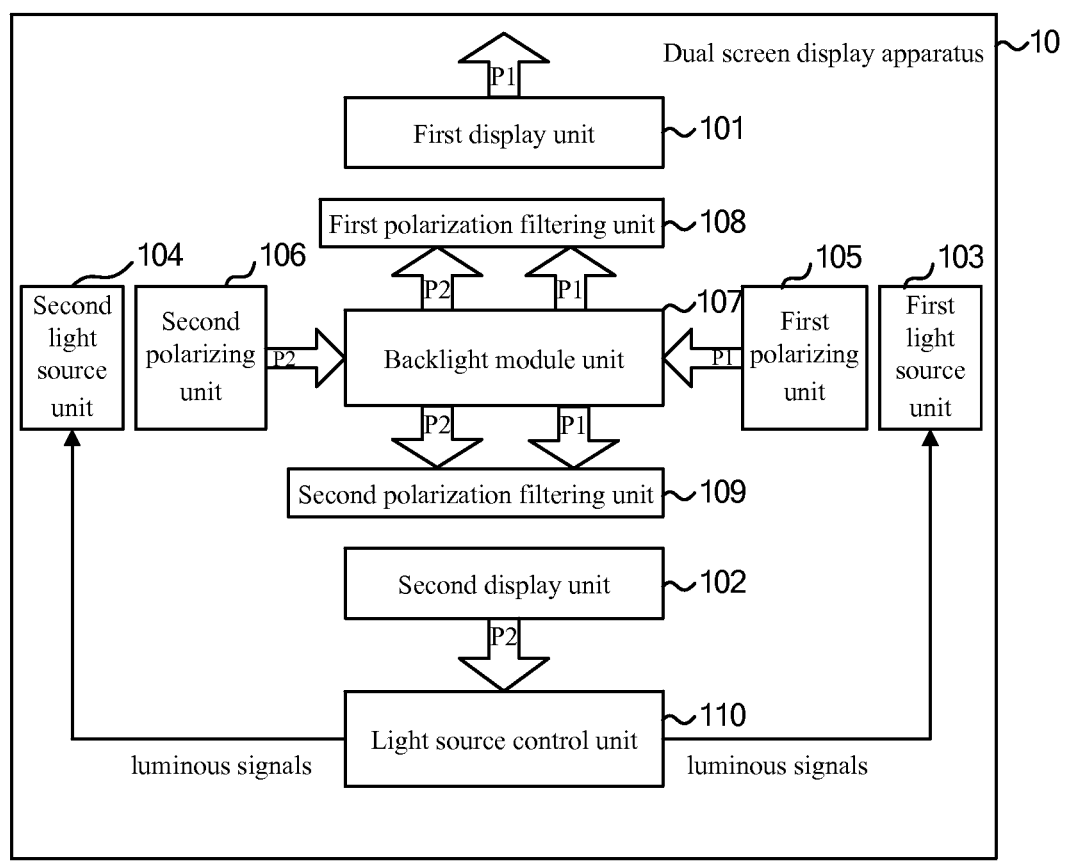
FIG. 4 illustrates a schematic of another display state of the dual screen display apparatus according to an embodiment of the present invention.

FIG. 4 illustrates a schematic of another display state of the dual screen display apparatus according to an embodiment of the present invention. Specifically, FIG. 4 shows a state of a display performed by two display units in the dual screen display apparatus (in the embodiment shown in FIG. 4, the first display unit 101 and the second display unit 102 perform the display simultaneously).

As shown in FIG. 4, when the display control unit 20 in the electronic device 1 indicates that the first display unit 101 and the second display unit 102 are expected to perform the display simultaneously, the light source control unit 110 generates the corresponding light source control signal. In other words, the light source control unit 110 transmits a luminous signal to the first light source unit 103 and the second light source unit 104.

In response to the received light source control signal, both the first light source unit 103 and the second light source unit 104 emit light. The illumination light emitted from the first light source unit 103 is firstly converted to the polarization light P1 polarized in the first direction through the first polarizing unit 105. The polarization light P1 shoots towards the first display unit 101 and the second display unit 102 simultaneously through the backlight module unit 107. Before reaching the first display unit 101, the polarization light P1 firstly reaches the first polarization filtering unit 108 arranged before the first display unit 101; since the polarization direction of the first polarization filtering unit 108 is same as that of the first polarizing unit 105, the illumination light converted to the polarization light P1 may pass through the first polarization filtering unit 108 to reach the light receiving surface of the first display unit 101. On the contrary, when the polarization light P1 reaches the second polarization filtering unit 109 arranged before the second display unit 102, the illumination light converted to the polarization light P1 cannot pass through the second polarization filtering unit 109 because the polarization direction of the second polarization filtering unit 109 is orthogonal to the polarization direction of the first polarizing unit 105, that is, the polarization direction of the second polarization filtering unit 109 is the second direction orthogonal to the first direction. Similarly, the illumination light emitted from the second light source unit 104 is firstly converted to the polarization light P2 polarized in the second direction through the second polarizing unit 106. The polarization light P2 shoots towards the first display unit 101 and the second display unit 102 simultaneously through the backlight module unit 107. Before reaching the second display unit 102, the polarization light P2 firstly reaches the second polarization filtering unit 109 arranged before the second display unit 102; since the polarization direction of the second polarization filtering unit 109 is same as that of the second polarizing unit 106, the illumination light converted to the polarization light P2 may pass through the second polarization filtering unit 109 to reach the light receiving surface of the second display unit 102. On the contrary, when the polarization light P2 reaches the first polarization filtering unit 108 arranged before the first display unit 101, the illumination light converted to the polarization light P2 cannot pass through the first polarization filtering unit 108 because the polarization direction of the first polarization filtering unit 108 is orthogonal to the polarization direction of the second polarizing unit 106. In other words, in this state, the first display unit 101 and the second display unit 102 receive the polarization light P1 from the first light source unit 103 and the polarization light P2 from the second light source unit 104, respectively, and the first display unit 101 and the second display unit 102 perform the display simultaneously.

Hereinbefore, the dual screen display apparatus, dual screen display method and electronic device using the dual screen display apparatus according to embodiments of the present invention which is described with reference to FIG. 1 to FIG. 4 is able to achieve slimmer and thinner dual screen display apparatus and perform an appropriate dual screen display according to the display requirements.

It is noted that in this specification, the terms "comprising" or "including", as well as other variation thereof, are intended to cover a non-exclusive inclusion such that the process, method, article, or device that comprises a list of elements not only comprises those elements but may comprise other elements not expressly listed or inherent to such process, method, article or device; under the circumstance without more constraints, elements defined by the expression "includes one" do not exclude other identical elements existed in the process, method, article, or device including those elements.

Finally, it should be noted that the above list of processes include not only processes performed in time series but also processes performed in parallel or independently, the processes being not necessarily performed in time series.

Through the above description of the embodiments, the skilled in the art can clearly understand that the present invention can be implemented by means of software plus a necessary hardware platform; certainly, it can also be implemented entirely by hardware. Based on such understanding, all or part of the contribution of the technical solution of the present invention to the background art, may be embodied in the form of a software product, which can be stored in a storage medium, such as a ROM/RAM, hard disk, optical disk, etc., comprising a plurality of instructions for allowing a computer device (which may be a personal computer, a server, or a network device, etc.) to perform the methods described in various embodiments or in some portion of the embodiments of the present invention.

The above has described the present invention in detail, and specific examples are used herein to explain the principles and embodiments of the invention. However, the above description of the embodiments is only used to help understanding the methods and core ideas of the present invention; meanwhile, for the ordinary skilled in the art, based on the ideas of the invention, variations can be made both in implementations and application ranges; in summary, the content of this specification should not be understood as limitative to the present invention.

The invention claimed is:

1. A dual screen display apparatus comprising:
   a first display unit, a second display unit, and a light receiving surface of the first display unit being arranged opposite to a light receiving surface of the second display unit;
   a backlight module unit, arranged between the light receiving surface of the first display unit and the light receiving surface of the second display unit;
   a light source unit, for emitting illumination light to the backlight module unit; and
   a first polarization filtering unit and a second polarization filtering unit, arranged on the light receiving surface of the first display unit and the light receiving surface of the second display unit respectively, and the polarization direction of the first polarization filtering unit is orthogonal to the polarization direction of the second polarization filtering unit;
   wherein the illumination light is deflected to the first display unit and the second display unit through the backlight module unit, and illuminates the first display unit and the second display unit after passing through the first polarization filtering unit and the second polarization filtering unit, and
   wherein the light source unit comprises a first light source unit and a second light source unit that are arranged on either side of the backlight module unit respectively and are configured to emit a first illumination light and a second illumination light respectively, and
   the dual screen display apparatus further comprising a first polarizing unit and a second polarizing unit, the first polarizing unit and the second polarizing unit being arranged between the first light source unit and the backlight module unit and between the second light source unit and the backlight module unit, respectively and being configured to receive the first illumination light and the second illumination light to generate a first polarized illumination light and a second polarized illumination light, respectively; wherein the polarization direction of the first polarization filtering unit is same as that of the first polarizing unit and the polarization direction of the second polarization filtering unit is same as that of the second polarizing unit, and
   a light source control unit configured to control the first light source unit and the second light source unit to emit light simultaneously according to the requirements.

2. The dual screen display apparatus of claim 1, wherein the first polarizing unit and the second polarizing unit is a polarizing diaphragm or polarizing glass.

3. The dual screen display apparatus of claim 1, wherein the backlight module unit comprises a light guide plate and diffusion sheet.

4. The dual screen display apparatus of claim 3, wherein the backlight module unit further comprises a brightness enhancement film.

5. A dual screen display method applied in an electronic device, the electronic device including a display control unit and a dual screen display apparatus; the dual screen display apparatus including a first display unit, a second display unit, and a light receiving surface of the first display unit being arranged opposite to a light receiving surface of the second display unit; a backlight module unit arranged between the light receiving surface of the first display unit and the light receiving surface of the second display unit; a light source unit configured to emit illumination light to the backlight module unit; a light source control unit configured to control the light source unit to emit light; and a first polarization filtering unit and a second polarization filtering unit arranged on the light receiving surface of the first display unit and the light receiving surface of the second display unit respectively, and the polarization direction of the first polarization filtering unit is orthogonal to the polarization direction of the second polarization filtering unit; wherein the illumination light is deflected to the first display unit and the second display unit through the backlight module unit, and illuminates the first display unit and the second display unit after passing through the first polarization filtering unit and the second polarization filtering unit; the dual screen display method comprising:
   the display control unit transmitting display control signals to the dual screen display apparatus according to the display requirements of the electronic device;
   the light source control unit in the dual screen display apparatus generating light source control signals based on the received display control signals and transmitting the light source control signals to the light source unit, and
   the light source unit emitting light based on the received light source control signals,
   wherein the light source unit comprises the first light source unit and the second light source unit which are arranged on either side of the backlight module unit respectively and configured to emit the first illumination light and the second illumination light respectively, and
   the dual screen display apparatus further comprises a first polarizing unit and a second polarizing unit which are arranged between the first light source unit and the backlight module unit and between the second light source unit and the backlight module unit respectively and are configured to receive the first illumination light and the second illumination light to generate the first polarized illumination light and the second polarized illumination light, respectively; wherein the polarization direction of the first polarization filtering unit is same as that of the first polarizing unit and the polarization direction of the second polarization filtering unit is same as that of the second polarizing unit, wherein the light source unit emitting light based on the received light source control signals comprises: the first light source unit and the second light source unit emitting light simultaneously based on the received light source control signals.

6. An electronic device comprising:

a dual screen display apparatus; and a display control unit configured to control the dual screen display apparatus, wherein the dual screen display apparatus comprises a first display unit, a second display unit, and a light receiving surface of the first display unit being arranged opposite to a light receiving surface of the second display unit;

a backlight module unit arranged between the light receiving surface of the first display unit and the light receiving surface of the second display unit;

a light source unit configured to emit illumination light to the backlight module unit; and a first polarization filtering unit and a second polarization filtering unit arranged on the light receiving surface of the first display unit and the light receiving surface of the second display unit respectively, and the polarization direction of the first polarization filtering unit is orthogonal to the polarization direction of the second polarization filtering unit, wherein the illumination light is deflected to the first display unit and the second display unit through the backlight module unit, and illuminates the first display unit and the second display unit after passing through the first polarization filtering unit and the second polarization filtering unit, and wherein the light source unit comprises the first light source unit and the second light source unit arranged on either side of the backlight module unit respectively and configured to emit the first illumination light and the second illumination light respectively, and the dual screen display apparatus further comprises a first polarizing unit and a second polarizing unit which are arranged between the first light source unit and the backlight module unit and between the second light source unit and the backlight module unit respectively and are configured to receive the first illumination light and the second illumination light to generate the first polarized illumination light and the second polarized illumination light, respectively; wherein the polarization direction of the first polarization filtering unit is same as that of the first polarizing unit and the polarization direction of the second polarization filtering unit is same as that of the second polarizing unit, and a light source control unit for controlling the first light source unit and the second light source unit to emit light simultaneously according to the requirements.

* * * * *